United States Patent
Lu et al.

(10) Patent No.: US 11,099,580 B2
(45) Date of Patent: Aug. 24, 2021

(54) SYSTEMS AND METHODS FOR PROVIDING NAVIGATION ASSISTANCE TO A DELIVERY ROBOT

(71) Applicant: Ford Global Technologies, LLC, Dearborn, MI (US)

(72) Inventors: Jianbo Lu, Northville, MI (US); Justin Miller, Royal Oak, MI (US); Sanghyun Hong, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 263 days.

(21) Appl. No.: 16/267,239

(22) Filed: Feb. 4, 2019

(65) Prior Publication Data

US 2020/0249698 A1 Aug. 6, 2020

(51) Int. Cl.
*G05D 1/02* (2020.01)
*G06Q 10/06* (2012.01)
(Continued)

(52) U.S. Cl.
CPC ......... *G05D 1/0295* (2013.01); *G05D 1/0088* (2013.01); *G05D 1/0276* (2013.01);
(Continued)

(58) Field of Classification Search
CPC .. G05D 1/0295; G05D 1/0276; G05D 1/0088; G05D 2201/0213;
(Continued)

(56) References Cited

U.S. PATENT DOCUMENTS 10,802,487 B2 * 10/2020 Igata ...................... G06Q 20/20
2016/0200438 A1 7/2016 Bokeno et al.
(Continued)

FOREIGN PATENT DOCUMENTS

EP 3258433 A1 12/2017

OTHER PUBLICATIONS

Autonomous Mobile Robots and the Postal Service. Office of Inspector General Unites States Postal Service. Apr. 9, 2018 (46 pages). Retrieved from https://www.uspsoig.gov/document/autonomous-mobile-robots-and-postal-service.
(Continued)

*Primary Examiner* — Rodney A Butler
(74) *Attorney, Agent, or Firm* — Brandon Hicks; Eversheds Sutherland (US) LLP

(57) ABSTRACT

This disclosure is generally directed to systems and methods for using an autonomous vehicle to provide navigation assistance to a delivery robot. In one exemplary implementation, the delivery robot is transported by the autonomous vehicle to a delivery destination such as a residence or a workplace. The delivery robot disembarks at the delivery destination for delivering a package to a recipient at the residence or workplace. A computer system in the autonomous vehicle communicates with a navigation assistance system of the autonomous vehicle to obtain information pertaining to a terrain between the autonomous vehicle and a package drop-off spot at the residence or workplace, and uses the information to generate a route map of the terrain. The autonomous vehicle may transmit the route map and/or navigation instructions derived from the route map, to the delivery robot to assist the delivery robot navigate around obstacles and reach the package drop-off spot.

20 Claims, 8 Drawing Sheets

(51) Int. Cl.
*G05D 1/00* (2006.01)
*G06Q 10/08* (2012.01)

(52) U.S. Cl.
CPC ... *G06Q 10/083* (2013.01); *G05D 2201/0213* (2013.01); *G05D 2201/0216* (2013.01)

(58) Field of Classification Search
CPC ... G05D 2201/0216; G05D 2201/0211; G05D 1/0274; G06Q 10/083
See application file for complete search history.

(56) References Cited

U.S. PATENT DOCUMENTS

| | | | | |
|---|---|---|---|---|
| 2019/0047462 | A1* | 2/2019 | Vijayaraghavan | B60W 30/00 |
| 2019/0329691 | A1* | 10/2019 | Crawford | G06Q 10/08355 |
| 2020/0026281 | A1* | 1/2020 | Xiao | G06Q 50/28 |
| 2020/0051001 | A1* | 2/2020 | Donnelly | G06Q 10/02 |

OTHER PUBLICATIONS

Glanfield, E., "Is this the end of the white van man? Driverless delivery vehicles will be trialled on the streets of London next year," Daily Mail, Dec. 20, 2015 (5 pages). Retrieved from https://www.dailymail.co.uk/news/article-3367720/Is-end-white-van-man-Driverless-delivery-vehicles-trialled-streets-London-year.html.

Mercedes-Benz Vans. "Vans & Robots: Efficient delivery with the mothership concept." Online Video Clip. YouTube, Sep. 16, 2016 (2 pages). Retrieved from https://www.youtube.com/watch?v=yUMOLzCsifs.

"New wave of robots set to deliver the goods," Kuwait Times, Jan. 30, 2017 (1 page). Retrieved from https://www.ehdf.com/wp-content/uploads/2017/03/SLA-HOSTING-PROVIDER-COMMENT-SACHIN-KUWAIT-TIMES-JAN-29-2017.pdf.

Starship Technologies. Starship (4 pages). Retrieved from https://www.starship.xyz/.

* cited by examiner

SYSTEMS AND METHODS FOR PROVIDING NAVIGATION ASSISTANCE TO A DELIVERY ROBOT

FIELD OF THE DISCLOSURE

This disclosure generally relates to robotic vehicles, and more particularly relates to systems and methods that use an autonomous vehicle to provide navigation assistance to a delivery robot.

BACKGROUND

Autonomous vehicles, which are often referred to by various other names such as robotic vehicles and unmanned vehicles, have of late become the focus of numerous developmental efforts. The developmental efforts have been directed to using autonomous vehicles for not only transporting human passengers but also for delivering various types of articles in various types of environments. An autonomous vehicle that is used for transporting human passengers typically incorporates navigation and sensing equipment that enables the autonomous vehicles to safely negotiate obstacles that may be encountered on a road (other vehicles, pedestrians, objects, etc.). The primary purpose of using the navigation and sensing equipment in the autonomous vehicle is to ensure passenger safety. Consequently, certain criteria such as sophistication, capabilities, and reliability, take precedence over certain other criteria such as cost and simplicity. On the other hand, an autonomous vehicle that is used for delivering an item such as a package, a pizza, or a grocery bag may have to traverse an area that does not necessarily include roads and/or pedestrians. The primary purpose of using navigation and sensing equipment in such an autonomous vehicle, which may be referred to as a delivery robot, is to ensure that the delivery robot avoids colliding with objects when traveling across a lawn, for example. The criteria used for selecting and using the navigation and sensing equipment in the delivery robot may therefore be different than that used for the navigation and sensing equipment used in an autonomous vehicle used for transporting human passengers. For example, the navigation and sensing equipment installed on the delivery robot may be less sophisticated and less expensive. However, it is desirable that any trade-off being made with respect to sophistication and cost for example, be made without sacrificing or compromising various functional features of the delivery robot. It is also desirable to identify alternative solutions that may augment certain capabilities of the delivery robot.

BRIEF DESCRIPTION OF THE DRAWINGS

A detailed description is set forth below with reference to the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

DETAILED DESCRIPTION

Figure 1:
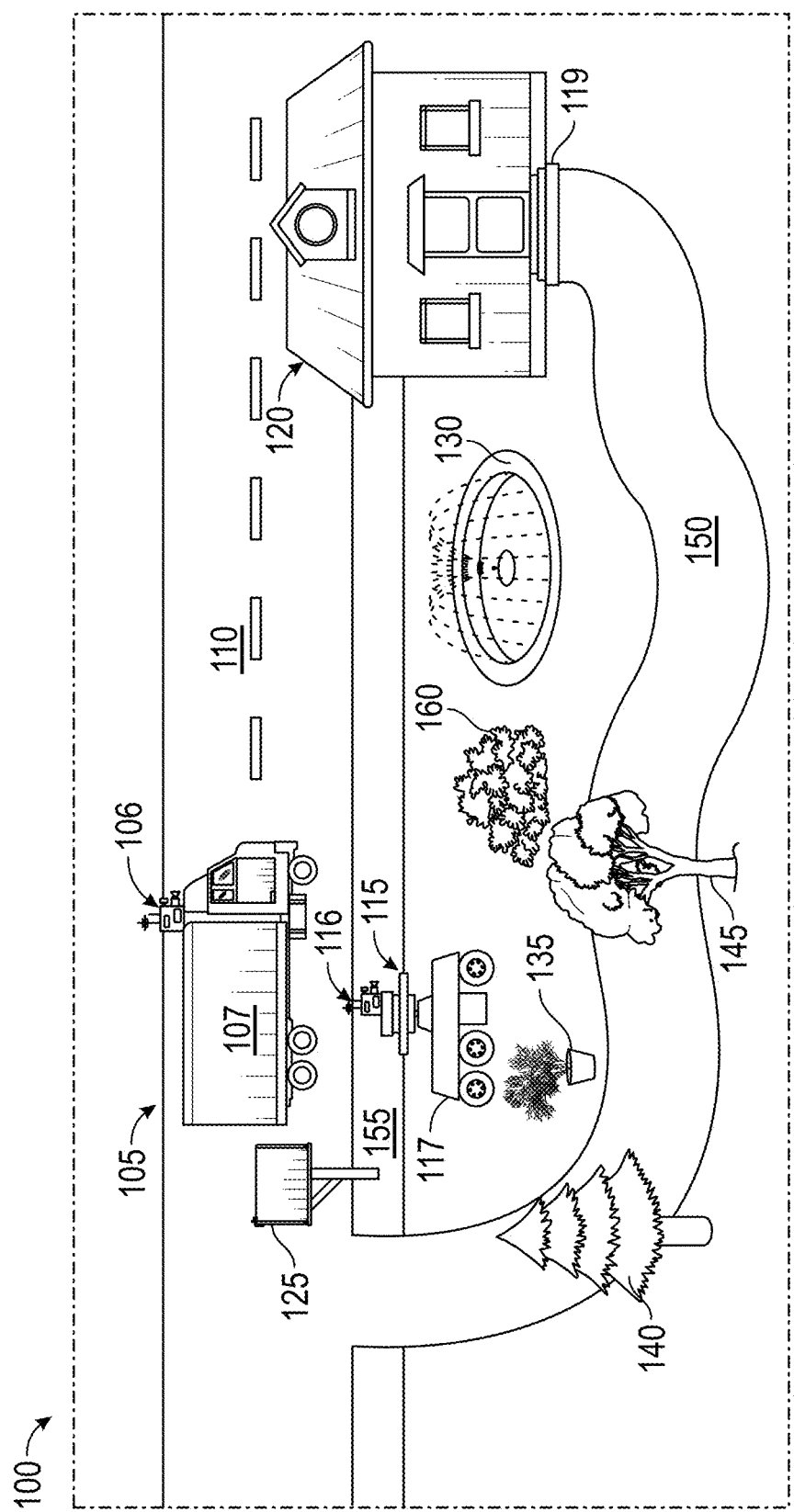
FIG. 1 shows an exemplary system wherein an autonomous vehicle provides navigation assistance to a delivery robot in accordance with an embodiment of the disclosure.

The disclosure will be described more fully hereinafter with reference to the accompanying drawings, in which exemplary embodiments of the disclosure are shown. This disclosure may, however, be embodied in many different forms and should not be construed as limited to the exemplary embodiments set forth herein. It will be apparent to persons skilled in the relevant art that various changes in form and detail can be made to various embodiments without departing from the spirit and scope of the present disclosure. Thus, the breadth and scope of the present disclosure should not be limited by any of the above-described exemplary embodiments but should be defined only in accordance with the following claims and their equivalents. The description below has been presented for the purposes of illustration and is not intended to be exhaustive or to be limited to the precise form disclosed. It should be understood that alternate implementations may be used in any combination desired to form additional hybrid implementations of the present disclosure. For example, any of the functionality described with respect to a particular device or component may be performed by another device or component. Furthermore, while specific device characteristics have been described, embodiments of the disclosure may relate to numerous other device characteristics. Further, although embodiments have been described in language specific to structural features and/or methodological acts, it is to be understood that the disclosure is not necessarily limited to the specific features or acts described. Rather, the specific features and acts are disclosed as illustrative forms of implementing the embodiments.

Certain words and phrases are used herein solely for convenience and such words and terms should be interpreted as referring to various objects and actions that are generally understood in various forms and equivalencies by persons of ordinary skill in the art. For example, the phrase "autonomous vehicle" as used herein may be referred to alternatively in general parlance and/or in this disclosure as a "self-driven vehicle" or a "robotic vehicle." As another example, words such as "data" and "information" may be used interchangeably in this disclosure and should be understood as being equivalent to each other in the context of the description. Furthermore, it should be understood that the word "example" as used herein is intended to be non-exclusionary and non-limiting in nature. More particularly, the word "exemplary" as used herein indicates one among several examples, and it should be understood that no undue emphasis or preference is being directed to the particular example being described.

In terms of a general overview, certain embodiments described in this disclosure are directed to systems and methods related to using an autonomous vehicle to provide navigation assistance to a delivery robot. In one exemplary implementation, the delivery robot may be transported by the autonomous vehicle to a delivery destination such as a residence or a workplace. The delivery robot disembarks at the delivery destination for delivering a package to a recipient at the residence or workplace. The delivery robot may disembark for example, on to a sidewalk beside a road on which the autonomous vehicle has been stopped. A computer system provided in the autonomous vehicle then communicates with a navigation assistance system of the autonomous vehicle to obtain information pertaining to a terrain (a lawn or a garden, for example) between the autonomous vehicle and a package drop-off spot at the residence or workplace. The information may be used by the computer system to generate a route map of the terrain. The route map may include an identification of various objects that may be obstacles in the path of the delivery robot as the delivery robot moves towards the package drop-off spot. The autonomous vehicle may transmit the route map and/or navigation instructions derived from the route map, to the delivery robot to assist the delivery robot navigate around the obstacles and reach the package drop-off spot. In an alternative implementation, the delivery robot may be transported by a first vehicle (an autonomous truck suitable for transporting multiple delivery robots, for example) to the residence or workplace, and a second vehicle (an autonomous car or small van, for example) may assist the delivery robot to deliver the package, and may also assist other delivery robots, if used.

FIG. 1 shows an exemplary system 100 that includes an autonomous vehicle 105 configured to provide navigation assistance to a delivery robot 115 in accordance with an embodiment of the disclosure. A few examples of the types of vehicles represented by the autonomous vehicle 105 in FIG. 1 include various types of self-driven vehicles (vans, trucks etc.) operated by entities such as Fedex®, UPS®, grocery stores, and restaurants, for delivering articles to recipients such as a person living in a residence or a person working in a workplace or business facility.

The autonomous vehicle 105 may include various components such as a navigation assistance system 106 and a computer system 107. The navigation assistance system 106 may include one or more of various components such as transponders, imaging device (video cameras, digital cameras, infrared cameras, etc.), motion detectors, distance sensors, proximity sensors, and audio sensors that may be communicatively coupled to the computer system 107 for guiding the autonomous vehicle 105 safely through traffic. The traffic may include various types of vehicles as well as pedestrians. The navigation assistance system 106 may also be used in cooperation with the computer system 107 to provide navigation assistance to the delivery robot 115 in accordance with the disclosure.

Figure 2:
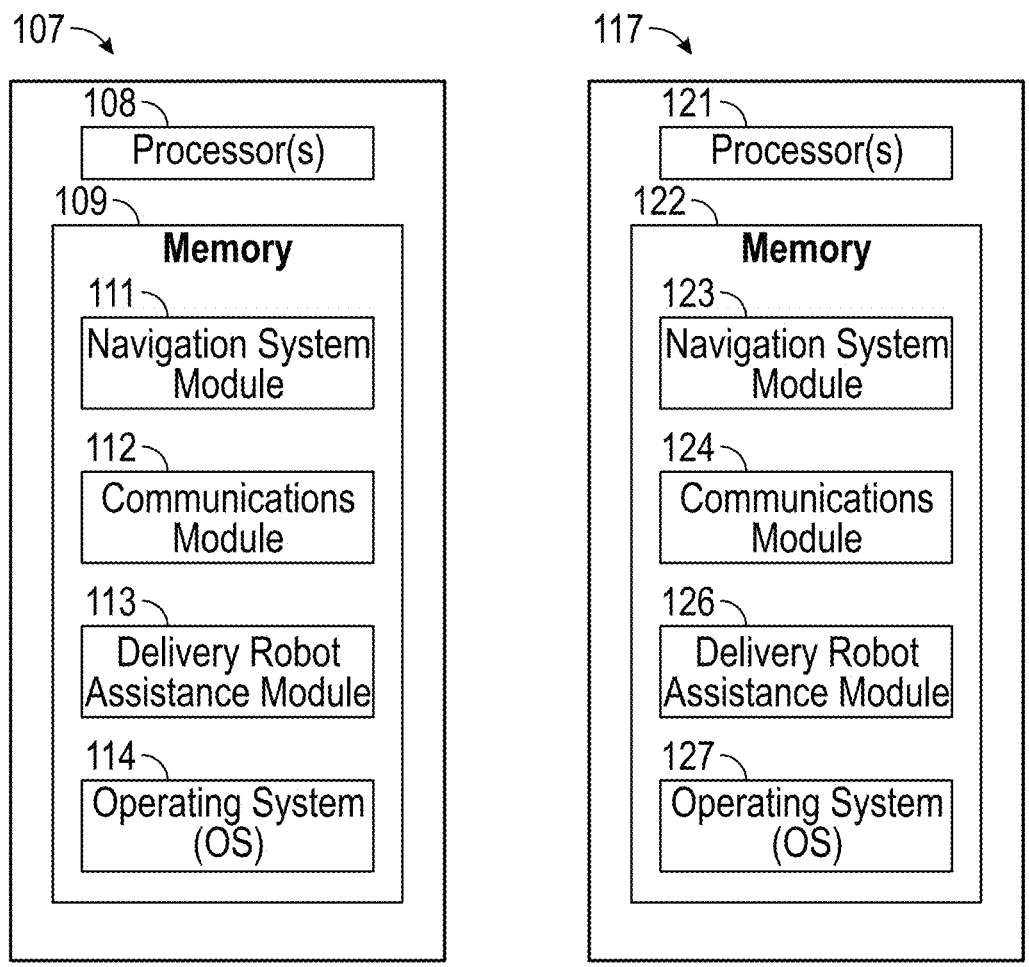
FIG. 2 shows some exemplary components of a first computer system that may be provided in the autonomous vehicle and a second computer system that may be provided in the delivery robot.

The computer system 107, which is illustrated in more detail in FIG. 2, may include several components such as a processor 108 and a memory 109. The memory 109, which is one example of a non-transitory computer-readable medium, may be used to store an operating system (OS) 114 and various other code modules such as a navigation system module 111, a communications module 112, and a delivery robot assistance module 113. The various code modules may be configured to cooperate with various types of hardware provided in the autonomous vehicle 105 for carrying out various operations.

For example, the navigation system module 111 may include software that cooperates with various types of hardware components in the autonomous vehicle 105. A few examples of such hardware may include the navigation assistance system 106 and various components (not shown) of the autonomous vehicle 105 such as a steering mechanism, an ignition switch, an accelerator, a braking mechanism, a door lock mechanism, and a Global Positioning System (GPS) system.

The communications module 112 may be configured to permit the autonomous vehicle 105 to communicate with various entities such as another autonomous vehicle and/or the delivery robot 115. The communications may be carried out in various ways, such as via a network (not shown) or wirelessly, and by using various types of communication formats. The communication formats may include machine-to-machine communication formats (wireless, Bluetooth®, Wi-Fi etc.) and human-to-machine communication formats (voice-controlled applications, for example).

The delivery robot assistance module 113 may include software that cooperates with various types of hardware components in the autonomous vehicle 105 to provide navigation assistance to the delivery robot 115. The navigation assistance may be provided to the delivery robot 115 in the form of various types of signals (such as data signals, command signals, query signals, and status signals) that are communicated to the delivery robot 115 by using for example, the communications module 112 and a transponder that may be part of the navigation assistance system 106.

The delivery robot 115 may be any type of robotic vehicle configured for transporting an article such as for example, a pizza delivery box, an item of mail, a package, or a grocery item. In one exemplary implementation, the autonomous vehicle 105 is configured to transport the delivery robot 115 to one or more delivery locations such as for example, a residence 120. The autonomous vehicle 105 may travel over a road 110 to reach an address of the residence 120. Upon reaching the address, the computer system 107 may control disembarking of the delivery robot 115 from the autonomous vehicle 105. The disembarking may be carried out for example, by the computer system 107 deploying a ramp and guiding the delivery robot 115 down the ramp and on to a sidewalk 155 adjacent to the road 110.

The delivery robot assistance module 113 may include a navigation assistance system 116 that may be used by the delivery robot 115 to avoid running into obstacles when moving from the sidewalk 155 and towards the residence 120. The navigation assistance system 116 may include hardware and/or software that is different than the hardware and/or software employed in the navigation assistance system 106 of the autonomous vehicle 105. For example, the hardware and/or software employed in the navigation assistance system 116 may be less sophisticated and less expensive. The delivery robot 115 is typically not transporting a human passenger. Consequently, the criteria used to avoid damage to the delivery robot 115 and/or to an object being transported by the delivery robot 115, is different than the criteria used to ensure passenger safety in the autonomous vehicle 105. A few examples of the types of hardware used in the navigation assistance system 116 of the delivery robot 115 may include various components such as transponders, video cameras, and proximity sensors that may be less sophisticated and less expensive than similar components used in the navigation assistance system 106 of the autonomous vehicle 105.

The computer system 117, which is illustrated in more detail in FIG. 2, may include several components such as a processor 121 and a memory 122. The memory 122, which is another example of a non-transitory computer-readable medium, may be used to store an operating system (OS) 127 and various other code modules such as a navigation system module 123, a communications module 124, and a delivery robot assistance module 126. The various code modules may be configured to cooperate with various types of hardware provided in the delivery robot 115 for carrying out various operations.

For example, the navigation system module 123 may include software that cooperates with various types of hardware components in the delivery robot 115. A few examples of such hardware may include the navigation assistance system 116 and various components (not shown) of the delivery robot such as a steering mechanism, an engine controller, and a braking mechanism. A transponder of the navigation assistance system 116 may be used by the computer system 117 to receive navigation assistance from the autonomous vehicle 105 as described in this disclosure. The navigation assistance provided by the autonomous vehicle 105 by using the sophisticated capabilities of the navigation assistance system 106 will typically exceed a level of performance obtainable by using the navigation assistance system 116 of the delivery robot 115. For example, the navigation assistance system 116 of the delivery robot 115 may lack equipment that provides a macroscopic view of a terrain between the delivery robot 115 and the residence 120 and/or may lack information on how to pre-emptively circumvent one or more obstacles that may be present in the terrain between the delivery robot 115 and the residence 120.

In the exemplary illustration shown in FIG. 1, the terrain may include a sidewalk 155, a pathway 150 and various objects such as a mailbox 125, a pot 135 containing a shrub, a first tree 140, a second tree 145, a bush 160, and a fountain 130. A conventional delivery robot may typically start moving from the sidewalk 155 and towards the residence 120 without having any information about any potential obstacles in its path. For example, the conventional delivery robot may first move forward and either sense the bush 160 (using an object sensor) or collide with the bush 160 if no object sensor has been provided. The conventional delivery robot may then go around the bush 160 before sensing (or colliding with) the fountain 130. The conventional delivery robot may then turn back from the fountain 130 and towards the bush 160 to try and discover an alternative route. Thus, the movement of the conventional delivery robot would involve a trial-and-error approach to reach the residence 120, thereby expending precious delivery time and risking damage to the delivery robot and/or package transported by the delivery robot.

In contrast, in an exemplary embodiment in accordance with the disclosure, the delivery robot 115 obtains a route map that is generated by the autonomous vehicle 105 and uses this route map to travel from the sidewalk 155 to the residence 120. The autonomous vehicle 105 uses the navigation assistance system 106 to scan the terrain between the autonomous vehicle 105 and the residence 120 and obtain information about the terrain. The sophisticated equipment of the navigation assistance system 106 may be used to detect various objects that may constitute obstacles and/or may be impassable or risky to traverse (steep slopes, water bodies, icy patches, hedges, etc.) by the delivery robot 115 when traveling towards a package drop-off spot such as an entryway to the residence 120 or a package placement location such as a stoop 119 near the entryway.

In one exemplary implementation, the navigation assistance system 106 may use a light detection and ranging (LIDAR) device, a radar device, or a sonar device, to obtain information about the terrain. Such a LIDAR device, radar device, or sonar device may be too expensive to provide in the delivery robot 115. The information gathered by the navigation assistance system 106 may be used by the computer system 107 to identify, and map out, an optimal travel route for the delivery robot 115 to follow (for example, via the pathway 150, after avoiding the pot 135 containing the shrub). The travel route and/or information about the terrain/obstacles may be included in a route map, which is transmitted to the delivery robot 115. The transmission of the route map and/or other navigation data may be carried out by using, for example, a transmitter (or transponder) in the navigation assistance system 106 and a receiver (or transponder) in the navigation assistance system 116 of the delivery robot 115. The communications may be carried out using various communication formats, such as Wi-Fi, Bluetooth®, and 5G wireless for example.

The use of the route map by the delivery robot 115 offers various benefits such as package delivery efficiency and optimization of delivery time (which is typically an important criterion for delivery services). Furthermore, less expensive components may be used in the navigation assistance system 116 of the delivery robot 115 than those used in the navigation assistance system 106 of the autonomous vehicle 105.

The cost benefit is even more pronounced when more than one delivery robot is deployed from the autonomous vehicle 105. In one exemplary scenario, the autonomous vehicle 105 may be parked at the entrance of a subdivision and a number of delivery robots may be concurrently deployed for making deliveries to multiple residences in the subdivision. Each of the delivery robots is provided with a respective route map that is generated by taking into consideration the respective residences to which the delivery robots have to travel. In some implementations, a delivery robot may utilize its own navigation assistance systems in lieu of, or in addition to, using the route map or navigation assistance provided by the autonomous vehicle 105.

FIG. 2 shows some exemplary components of the computer system 107 that may be provided in the autonomous vehicle 105 and the computer system 117 that may be provided in the delivery robot 115. Some of the functions performed by these exemplary components have been described above.

Figure 3:
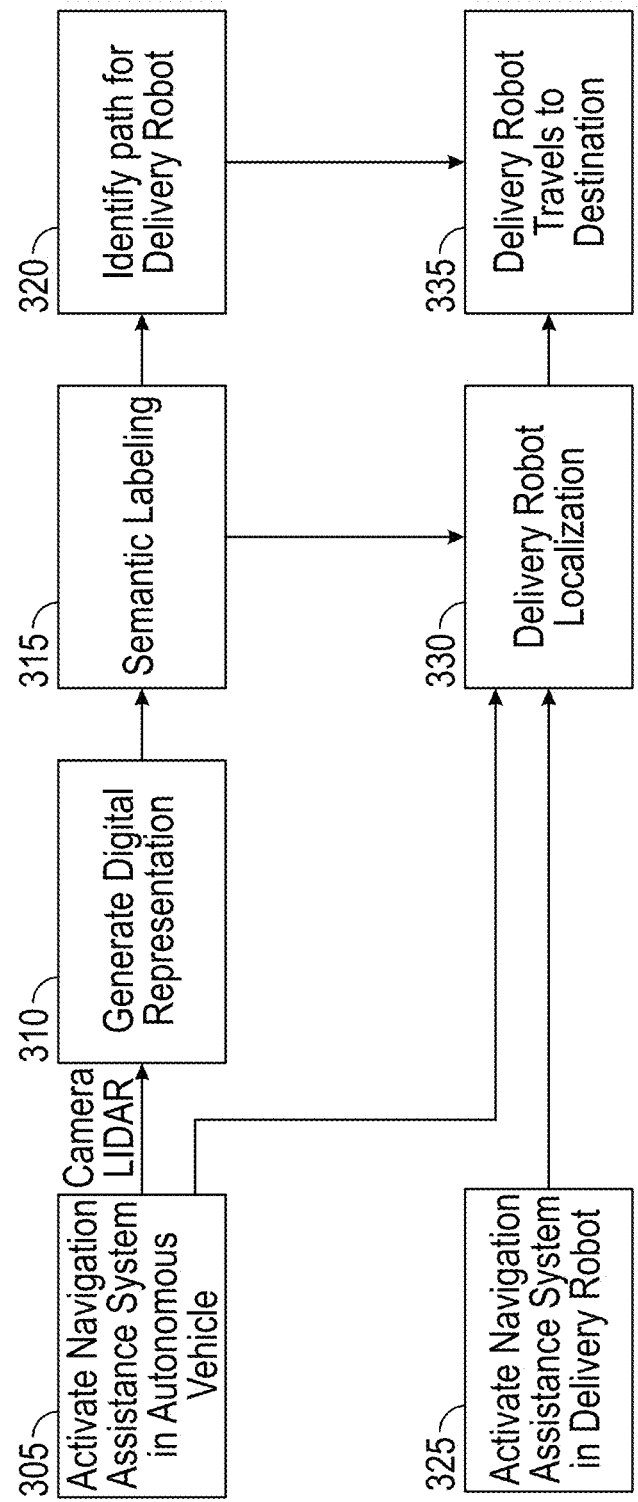
FIG. 3 shows some exemplary operations associated with an autonomous vehicle providing navigation assistance to a delivery robot in accordance with an embodiment of the disclosure.

FIG. 3 shows some exemplary operations associated with the autonomous vehicle 105 providing navigation assistance to the delivery robot 115 to enable the delivery robot 115 to travel to a destination, which is the residence 120 in this example. The exemplary sequence of operations can be executed by the autonomous vehicle 105 and the delivery robot 115 using hardware, software, or a combination thereof. In the context of software, the operations can include computer-executable instructions stored on one or more non-transitory computer-readable media such as the memory 109 and the memory 122, that, when executed by one or more processors such as the processor 108 and the processor 121, perform the recited operations. Generally, computer-executable instructions include routines, programs, objects, components, data structures, and the like that perform particular functions or implement particular abstract data types. The order in which the operations are described is not intended to be construed as a limitation, and any number of the described operations may be carried out in a different order, omitted, combined in any order, and/or carried out in parallel.

Figure 4:
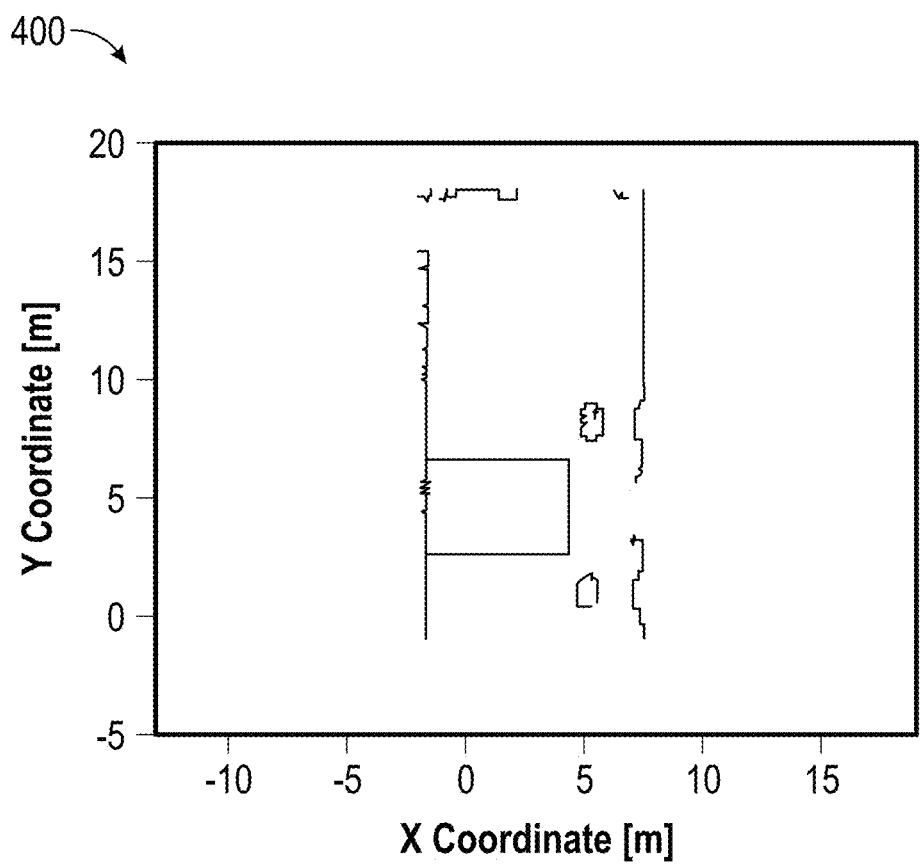
FIG. 4 shows an exemplary route map generated by a computer system of the autonomous vehicle to provide navigation assistance to a delivery robot in accordance with an exemplary embodiment of the disclosure.

At block 305, the navigation assistance system 106 of the autonomous vehicle 105 is activated for scanning the terrain between the autonomous vehicle 105 and the residence 120 and obtaining information about the terrain. The scanning may be carried out by using devices such as a camera, a LIDAR device, a radar device, and/or a sonar device that may be a part of the navigation assistance system 106. At block 310, information obtained by scanning the terrain may be used to generate a digital representation of the terrain. The digital representation may be provided in various forms such as one or more images or a map. An exemplary digital representation in the form of a map 400 that is generated by using a LIDAR device of the navigation assistance system 106 is shown in FIG. 4. The map 400, which may be generated by including a simultaneous localization and mapping (SLAM) procedure, provides information such as certain areas of the terrain that may be free-space, objects that may constitute obstacles, and areas/objects having unknown characteristics. However, the map 400 may fail to provide some types of information such as a current location of the delivery robot 115 and a location/description of an entryway of the residence 120.

Figure 5:
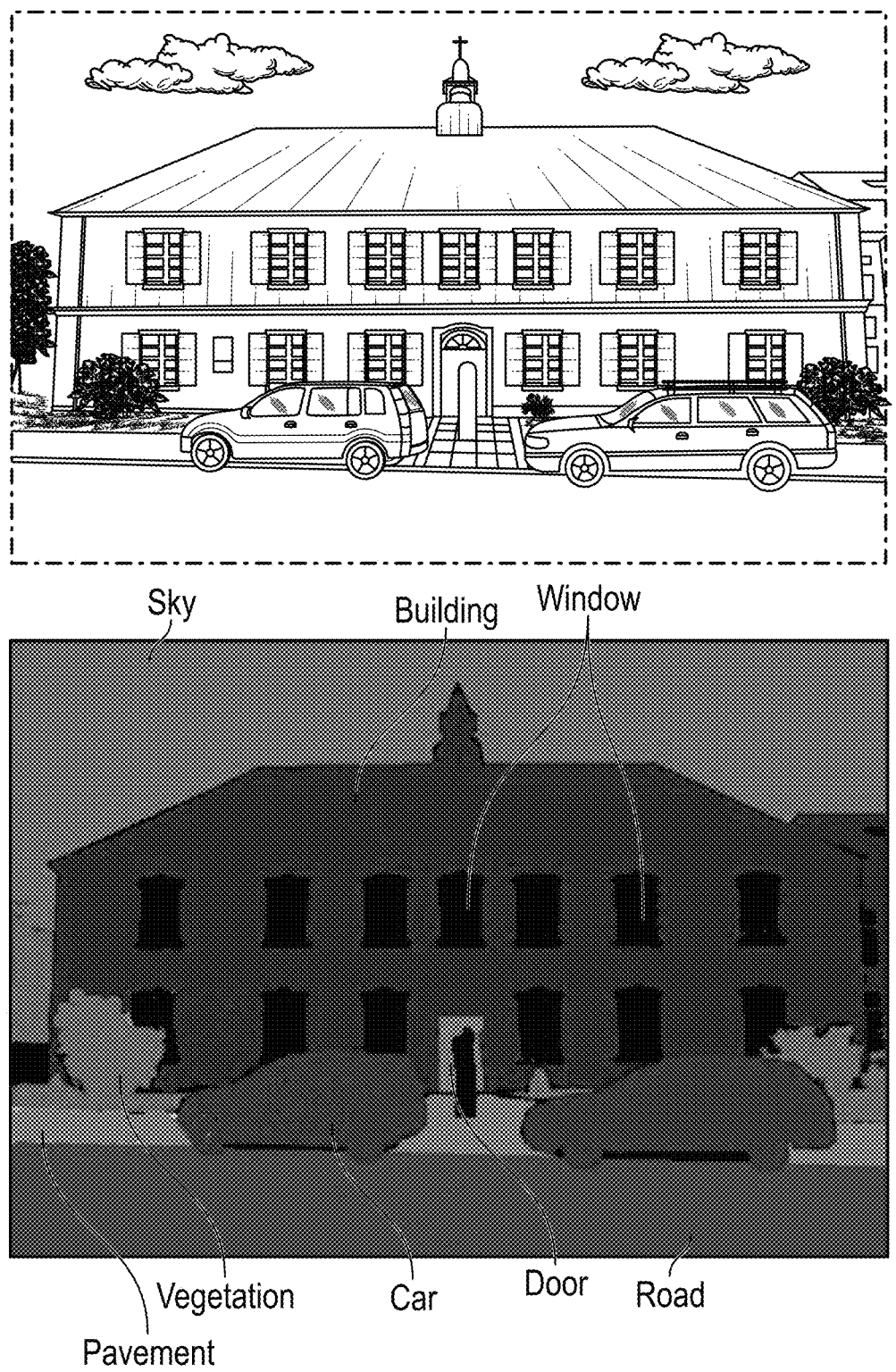
FIG. 5 shows an exemplary image of a residence and a digital representation of a front view of the residence together with other objects, in accordance with an exemplary embodiment of the disclosure.

At block 315, semantic labeling may be carried out upon the map 400 (or on the digital representation) that is generated at block 310. The semantic labeling may be carried out in order to include some or all of the information that may be missing in the map 400 (or the digital representation). In one exemplary implementation, data obtained from a camera of the navigation assistance system 106 of the autonomous vehicle 105 is passed through a labeling algorithm that classifies each pixel of the map 400 or digital representation as a type of object. The information derived by using the labeling algorithm may then be combined with the map 400 in the form of labels that provide an indication as to which areas of the terrain are traversable or not traversable and other items such as a view of the entryway. FIG. 5 shows an exemplary image of a residence (such as the residence 120), and a digital representation of a front view of the residence together with objects present in the terrain between the autonomous vehicle 105 and the residence. Some or all of these objects may constitute obstacles to the delivery robot 115.

At block 320, the route map 400 (or digital representation) having the semantic labeling may be used by the computer system 107 in the autonomous vehicle 105 to identify a path for the delivery robot 115 to travel to the entryway of the residence 120. In one exemplary implementation, the entryway may be represented by map coordinates in the digital representation and a current location of the delivery robot 115 (on the sidewalk 155, for example) may be also represented by map coordinates. The path may be generated by the computer system 107 by using a path-planning algorithm and may take into consideration various factors such as optimal distances, optimal sped of travel of the delivery robot 115, and identification and avoidance of one or more obstacles between the current location of the delivery robot 115 and the entryway of the residence 120. The generated path may then be included in the route map that is provided to the delivery robot 115 to travel to the entryway of the residence 120 as indicated by block 335.

At block 325, the delivery robot 115 may use its navigation assistance system 116 to sense some areas near the delivery robot 115. For example, the delivery robot 115 may use an object sensor of the navigation assistance system 116 to detect an object close to the delivery robot 115, such as the autonomous vehicle 105. The navigation assistance system 116 may lack the capability to detect objects that may be present beyond a limited field of operation of the object sensor and may also lack the ability to plot a travel path from the current location of the delivery robot 115 to the residence 120.

At block 330, the delivery robot 115 may obtain information from the autonomous vehicle 105 such as a digital representation of the terrain between the autonomous vehicle 105 and the residence 120. The information obtained by the delivery robot 115, such as a relative position of the delivery robot 115 with reference to the autonomous vehicle 105, may then be used to identify a current location of the delivery robot 115 in the digital representation provided by the autonomous vehicle 105. The current location of the delivery robot 115 may be provided in the form of map coordinates, which may then be transformed into global map coordinates in the digital representation provided by the autonomous vehicle 105. The global map coordinates may be used by the computer system 107 in the autonomous vehicle 105 together with the semantic labeling information provided on the map 400 (as indicated by block 315) to create a route map that may be used by the delivery robot 115 to travel to the residence 120 (as indicated by block 335). The route map and/or other information such as the global map coordinates of a location of the delivery robot 115 may also be used by the autonomous vehicle 105 to configure the navigation assistance system 106 (such as a LIDAR device) to track the delivery robot 115 as the delivery robot 115 starts moving from its current location and towards the residence 120.

Figure 6:
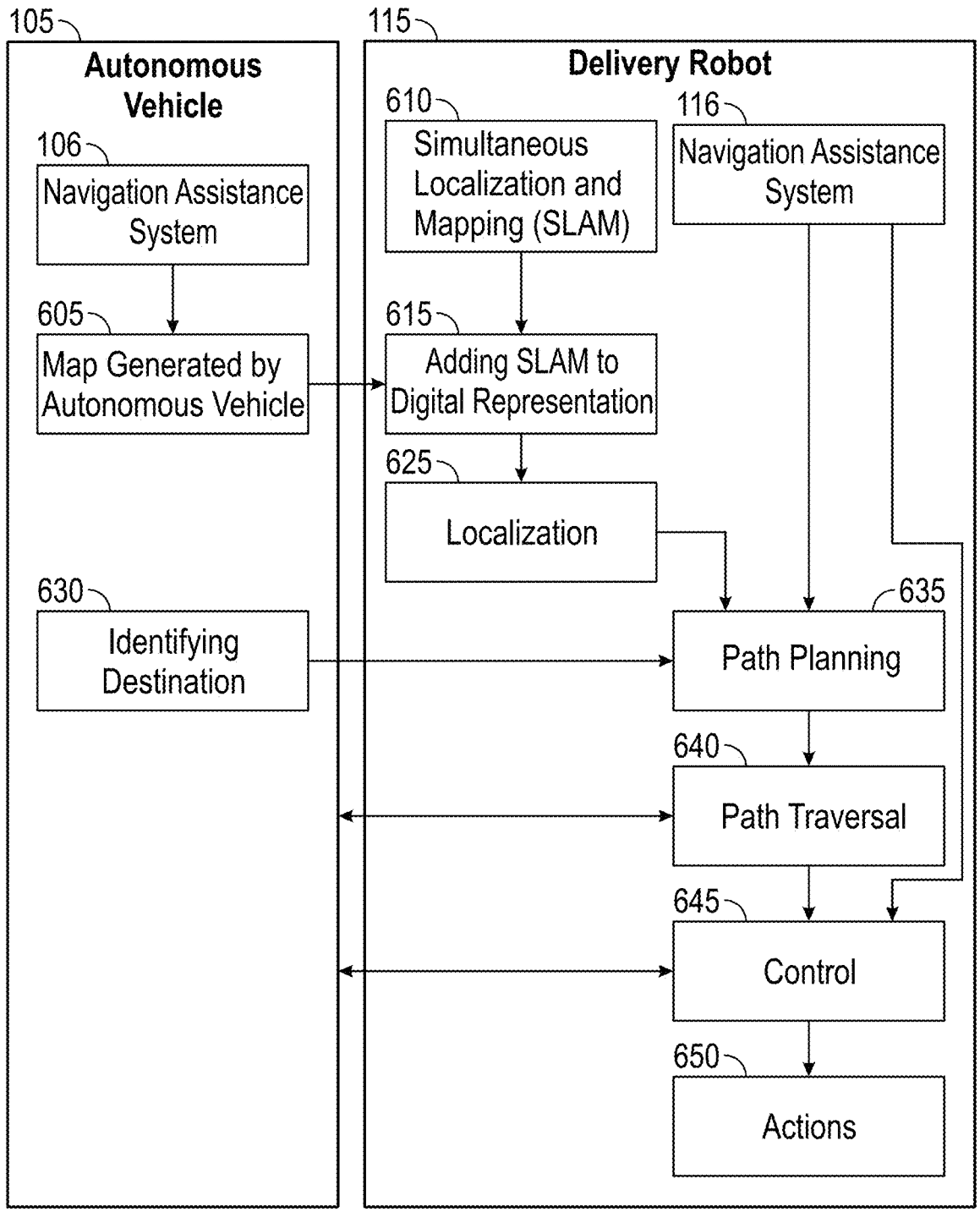
FIG. 6 shows some exemplary interactions between an autonomous vehicle and a delivery robot in a first exemplary mode of operation in accordance with the disclosure.

FIG. 6 shows some exemplary interactions between the autonomous vehicle 105 and the delivery robot 115 in accordance with a first exemplary mode of operation in accordance with the disclosure. The first exemplary mode of operation offers a high level of autonomy to the delivery robot 115. In this mode of operation, the autonomous vehicle 105 may transmit to the delivery robot 115, a route map or a digital representation of the terrain between the autonomous vehicle 105 and the destination. The digital representation and/or the route map may be generated by the computer system 107 using data received from the navigation assistance system 106. The delivery robot 115 may then use the digital representation and/or the route map to travel to the destination without further assistance from the autonomous vehicle 105.

The navigation assistance system 116 of the delivery robot 115 may be used to help the delivery robot 115 navigate to the destination. The first exemplary mode of operation allows the autonomous vehicle 105 to generate a certain type of data that is obtainable by using the sophisticated equipment of the navigation assistance system 106 in the autonomous vehicle 105 but may not be obtainable by using the navigation assistance system 106 in the delivery robot 115. The navigation assistance system 106 in the autonomous vehicle 105 may have certain advantages such as an extended field of view due to the navigation assistance system 106 being placed upon the roof of the autonomous vehicle 105 high above the ground. In contrast, the navigation assistance system 116 of the delivery robot 115 is located lower with respect to ground and may be unsuitable to derive some types of information of the terrain between the delivery robot 115 and the destination. However, the navigation assistance system 116 of the delivery robot 115 may offer some unique capabilities of its own, such as a capability to detect certain objects that may be blocked from view of the navigation assistance system 106 of the autonomous vehicle 105 for example.

Block 605 pertains to a map or a digital representation (such as the exemplary digital representation generated in block 310 shown in FIG. 3) that is transmitted by the autonomous vehicle 105 to the delivery robot 115. The map or digital representation contains information about the terrain between the autonomous vehicle 105 and the destination for the delivery robot 115.

Block 610, block 615, and block 625 pertain to the delivery robot 115 using the information contained in the map or digital representation to localize and identify a current location of the delivery robot 115 in the map or digital representation (such as indicated in block 330 of FIG. 3).

At block 630, the autonomous vehicle 105 may provide destination information to the delivery robot 115 (such as an entryway of the residence 120). At block 635, the delivery robot 115 uses the destination information and the current location of the delivery robot 115 to identify a path for the delivery robot 115 to travel from its current location to the entryway of the residence 120. The delivery robot 115 may also use the navigation assistance system 116 for identifying the path to be traveled.

At block 640, the delivery robot 115 traverses the path towards the residence 120. In one exemplary implementation, the autonomous vehicle 105 may track the movements of the delivery robot 115 to ensure that the delivery robot 115 is moving along the path. At block 645, the delivery robot 115 may transmit status signals (such as movement progress, package delivery confirmation, etc.) to the autonomous vehicle 105 and may receive signals from the autonomous vehicle 105 (such as acknowledgement signals, control signals, etc.). At block 650, the delivery robot 115 may perform various actions such as executing command signals received from the autonomous vehicle 105 and delivering the package at the residence 120.

Figure 7:
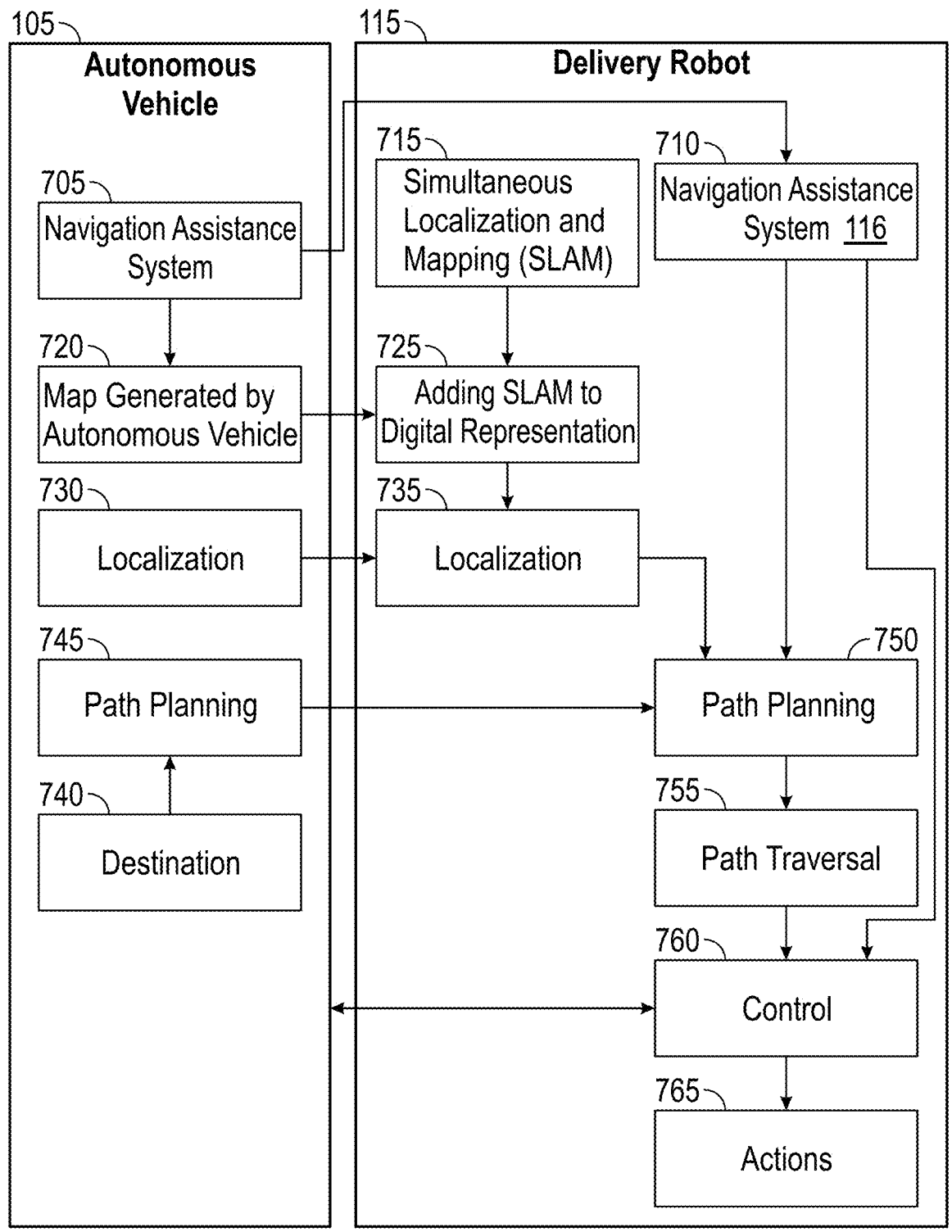
FIG. 7 shows some exemplary interactions between an autonomous vehicle and a delivery robot in a second exemplary mode of operation in accordance with the disclosure.

FIG. 7 shows some exemplary interactions between the autonomous vehicle 105 and the delivery robot 115 in accordance with a second exemplary mode of operation. The second exemplary mode of operation offers a moderate level of autonomy to the delivery robot 115. In this mode of operation, the autonomous vehicle 105 may transmit to the delivery robot 115, raw data and/or partially processed data obtained by using the navigation assistance system 106. The data may be transmitted to the delivery robot 115 in various ways such as on an intermittent basis, a continuous basis, or an as-needed basis. The delivery robot 115 may then combine the data received from the autonomous vehicle 105 with data (such as sensor data) obtained by using its own navigation assistance system 116.

The combined data may then be used by the delivery robot 115 to travel to the destination (the residence 120, for example). The second exemplary mode of operation allows the autonomous vehicle 105 to generate a certain type of data that is obtainable by using the sophisticated equipment of the navigation assistance system 106 in the autonomous vehicle 105 and allow the delivery robot 115 to complement, or supplement, this data with data obtained by using the navigation assistance system 116 in the delivery robot 115.

At block 705, the autonomous vehicle 105 provides to the delivery robot 115, data obtained by using the navigation assistance system 106 of the autonomous vehicle 105. This data may be combined with data obtained by using the navigation assistance system 116 of the delivery robot 115 (block 710). The combined data may be used by the delivery robot 115 to identify a path for the delivery robot 115 to travel to the entryway of the residence 120 (as indicated by block 750). Operations indicated in block 715, block 720, block 725, and block 735 are substantially similar to those described above with respect to block 610, block 605, block 615, and block 625 respectively of FIG. 6. However, operations indicated by block 735 may include interactive communications between the autonomous vehicle 105 and the delivery robot 115. This aspect is indicated by block 730 which pertains to the autonomous vehicle 105 performing a portion of the localization operation to determine a current location of the delivery robot 115 with respect to the autonomous vehicle 105 and providing this information to the delivery robot 115.

Block 740 pertains to identifying a destination for the delivery robot 115 (such as an entryway of the residence 120) and block 745 pertains to including the destination in planning a path for the delivery robot 115 to travel to the destination. The information generated by performing the operation indicated in block 745 may be provided to the delivery robot 115, which may then combine this information with other information such as the localization information generated at block 735. The combination operation is indicated by block 750.

At block 755, the delivery robot 115 uses the information generated at block 750 to move towards the residence 120. In one exemplary implementation, the autonomous vehicle 105 may track the movements of the delivery robot 115 to ensure that the delivery robot 115 is moving along the path. Block 760 and block 765 are substantially similar to those described above with respect to block 645 and block 650 respectively of FIG. 6.

Figure 8:
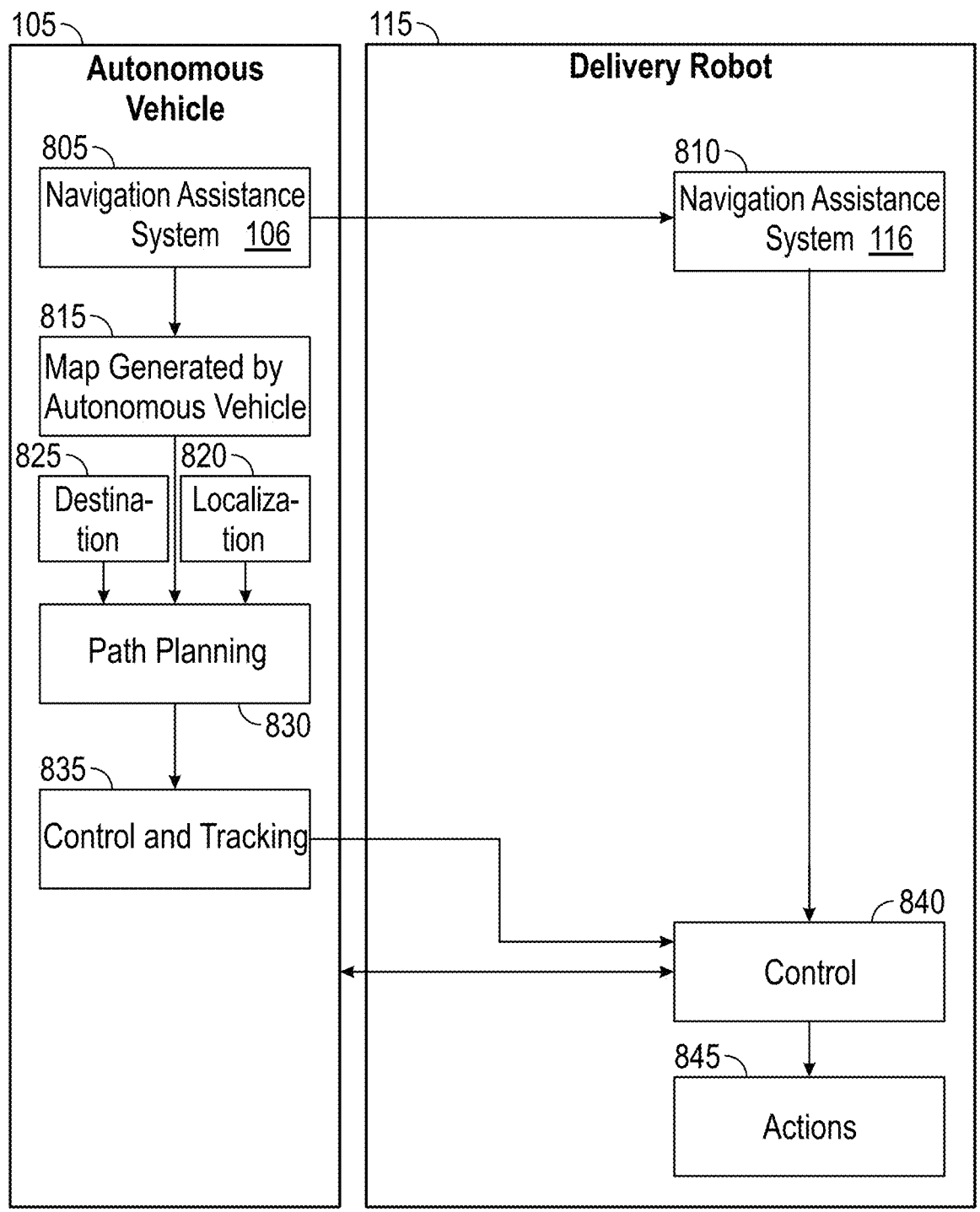
FIG. 8 shows some exemplary interactions between an autonomous vehicle and a delivery robot in a third exemplary mode of operation in accordance with the disclosure.

FIG. 8 shows some exemplary interactions between the autonomous vehicle 105 and the delivery robot 115 in accordance with a third exemplary mode of operation in accordance with the disclosure. The third exemplary mode of operation offers a low level of autonomy to the delivery robot 115. In this mode of operation, the autonomous vehicle 105 may transmit to the delivery robot 115, navigation instructions that are generated by the computer system 107 of the autonomous vehicle 105 by processing data obtained by using the navigation assistance system 106. The delivery robot 115 obeys the navigation instructions provided by the autonomous vehicle 105 without taking any significant actions on an independent basis. The navigation assistance system 116 provided in the delivery robot 115 may be rudimentary thereby providing cost benefits in this master-slave arrangement where the delivery robot 115 operates as a slave to the autonomous vehicle 105 which operates as a master.

At block 805, the autonomous vehicle 105 provides to the delivery robot 115, data obtained by using the navigation assistance system 106 of the autonomous vehicle 105. In some embodiments, this data may be combined with data obtained by using the navigation assistance system 116 of the delivery robot 115 (block 810). The data obtained by using the navigation assistance system 116 may be of a rudimentary nature such as may be needed to assist the delivery robot 115 navigate around an obstacle that is identified in the data provided by the autonomous vehicle 105.

At block 815, the computer system 107 of the autonomous vehicle 105 generates a map or a digital representation of the terrain between the autonomous vehicle 105 and the residence 120. At block 820, the computer system 107 of the autonomous vehicle 105 performs a localization operation to determine a current location of the delivery robot 115 with respect to the autonomous vehicle 105. The localization operation may be carried out upon the map or digital representation generated at block 815. At block 825, the computer system 107 of the autonomous vehicle 105 identifies a destination for the delivery robot 115 (such as an entryway of the residence 120).

Block 830 pertains to including the destination to the map or digital representation and the localization information for planning a travel path for the delivery robot 115 to travel to the destination. Block 835 pertains to the autonomous vehicle 105 generating control signals for executing the travel path and transmitting the control signals to the delivery robot 115. The control signals may be transmitted to the delivery robot 115 in various ways such as on an intermittent basis, a continuous basis, or an as-needed basis. Block 840 and block 845 are substantially similar to those described above with respect to block 645 and block 650 respectively of FIG. 6.

EXAMPLE EMBODIMENTS

In some instances, the following examples may be implemented together or separately by the systems and methods described herein.

Example 1 may include a method comprising: transporting a delivery robot in an autonomous vehicle, the autonomous vehicle including a computer system and a navigation assistance system; disembarking the delivery robot from the autonomous vehicle; generating, by the computer system, for the delivery robot, in cooperation with the navigation assistance system of the autonomous vehicle, a route map of a terrain between the autonomous vehicle and a package drop-off spot; and transmitting from the autonomous vehicle to the delivery robot, at least one of the route map or a set of navigation instructions that are based on the route map, to assist the delivery robot travel to the package drop-off spot.

Example 2 may include the method of example 1, wherein disembarking the delivery robot from the autonomous vehicle comprises disembarking the delivery robot on to a road or a sidewalk, and wherein the package drop-off spot is one of an entryway to a building or a package placement location.

Example 3 may include the method of example 2 and/or some other example herein, wherein the building is one of a residence or a business facility.

Example 4 may include the method of example 1 and/or some other example herein, wherein the route map includes an identification of one or more obstacles to be circumvented by the delivery robot to reach the package drop-off spot.

Example 5 may include the method of example 1 and/or some other example herein, wherein the navigation assistance system of the autonomous vehicle is configured to generate the route map by using at least one of a sensor or an imaging device of the navigation assistance system.

Example 6 may include the method of example 1 and/or some other example herein, wherein the route map comprises a digital representation of the terrain, the digital representation comprising one or more areas to be circumvented by the delivery robot to reach the package drop-off spot.

Example 7 may include the method of example 1 and/or some other example herein, wherein the route map comprises a digital representation of the terrain, the digital representation comprising a path to be traveled by the delivery robot from a current location of the delivery robot to the package drop-off spot.

Example 8 may include a method comprising: determining, by a navigation assistance system of an autonomous vehicle, a current location of a delivery robot; generating, by a computer system of the autonomous vehicle, in cooperation with the navigation assistance system of the autonomous vehicle, a route map of a terrain between the current location of the delivery robot and a package drop-off spot for the delivery robot; and transmitting from the autonomous vehicle to the delivery robot, at least one of the route map or a set of navigation instructions that are based on the route map, to assist the delivery robot travel from the current location to the package drop-off spot.

Example 9 may include the method of example 8, further comprising: transporting the delivery robot in the autonomous vehicle; and disembarking the delivery robot from the autonomous vehicle at the current location.

Example 10 may include the method of example 8 and/or some other example herein, wherein the computer system of the autonomous vehicle is configured to generate the route map by using at least one of a sensor or an imaging device of the navigation assistance system.

Example 11 may include the method of example 8 and/or some other example herein, wherein the route map comprises a digital representation of the terrain, the digital representation comprising one or more areas to be circumvented by the delivery robot when traveling from the current location to the package drop-off spot.

Example 12 may include the method of example 11 and/or some other example herein, wherein the one or more areas to be circumvented by the delivery robot include obstacles.

Example 13 may include the method of example 8 and/or some other example herein, wherein the route map is one of a 2D rendering or a 3D rendering of the terrain between the current location of the delivery robot and the package drop-off spot for the delivery robot.

Example 14 may include a system comprising: a delivery robot; and an autonomous vehicle comprising: a navigation assistance system; and a computer system comprising: at least one memory that stores computer-executable instructions; and at least one processor configured to access the at least one memory and execute the computer-executable instructions to at least: cooperate with the navigation assistance system to generate a route map of a terrain between the autonomous vehicle and a package drop-off spot at a delivery destination; and transmit to the delivery robot, at least one of the route map or a set of navigation instructions that are based on the route map, to assist the delivery robot travel to the package drop-off spot.

Example 15 may include the system of example 14, wherein the autonomous vehicle is configured to transport the delivery robot to the delivery destination, and wherein the package drop-off spot at the delivery destination is one of an entryway to a building or a package placement location.

Example 16 may include the system of example 14 and/or some other example herein, wherein the route map comprises a digital representation of the terrain, the digital representation comprising one or more areas to be circumvented by the delivery robot when traveling from a current location of the delivery robot at the delivery destination to the package drop-off spot.

Example 17 may include the system of example 16 and/or some other example herein, wherein the one or more areas to be circumvented by the delivery robot include obstacles.

Example 18 may include the system of example 14 and/or some other example herein, wherein the route map is one of a 2D rendering or a 3D rendering of the terrain between a current location of the delivery robot at the delivery destination and the package drop-off spot.

Example 19 may include the system of example 14 and/or some other example herein, wherein the navigation assistance system comprises at least one of a sensor or an imaging device.

Example 20 may include the system of example 19 and/or some other example herein, wherein the sensor is a Light Detection and Ranging (LIDAR) device.

In the above disclosure, reference has been made to the accompanying drawings, which form a part hereof, which illustrate specific implementations in which the present disclosure may be practiced. It is understood that other implementations may be utilized, and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, one skilled in the art will recognize such feature, structure, or characteristic in connection with other embodiments whether or not explicitly described.

Implementations of the systems, apparatuses, devices, and methods disclosed herein may comprise or utilize one or more devices that include hardware, such as, for example, one or more processors and system memory, as discussed herein. An implementation of the devices, systems, and methods disclosed herein may communicate over a computer network. A "network" is defined as one or more data links that enable the transport of electronic data between computer systems and/or modules and/or other electronic devices. When information is transferred or provided over a network or another communications connection (either hardwired, wireless, or any combination of hardwired or wireless) to a computer, the computer properly views the connection as a transmission medium. Transmission media can include a network and/or data links, which can be used to carry desired program code means in the form of computer-executable instructions or data structures and which can be accessed by a general purpose or special purpose computer. Combinations of the above should also be included within the scope of non-transitory computer-readable media.

Computer-executable instructions comprise, for example, instructions and data which, when executed at a processor, cause the processor to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

A memory device such as the memory 109 and the memory 122, can include any one memory element or a combination of volatile memory elements (e.g., random access memory (RAM, such as DRAM, SRAM, SDRAM, etc.)) and non-volatile memory elements (e.g., ROM, hard drive, tape, CDROM, etc.). Moreover, the memory device may incorporate electronic, magnetic, optical, and/or other types of storage media. In the context of this document, a "non-transitory computer-readable medium" can be, for example but not limited to, an electronic, magnetic, optical, electromagnetic, infrared, or semiconductor system, apparatus, or device. More specific examples (a non-exhaustive list) of the computer-readable medium would include the following: a portable computer diskette (magnetic), a random-access memory (RAM) (electronic), a read-only memory (ROM) (electronic), an erasable programmable read-only memory (EPROM, EEPROM, or Flash memory) (electronic), and a portable compact disc read-only memory (CD ROM) (optical). Note that the computer-readable medium could even be paper or another suitable medium upon which the program is printed, since the program can be electronically captured, for instance, via optical scanning of the paper or other medium, then compiled, interpreted or otherwise processed in a suitable manner if necessary, and then stored in a computer memory.

Those skilled in the art will appreciate that the present disclosure may be practiced in network computing environments with many types of computer system configurations, including in-dash vehicle computers, personal computers, desktop computers, laptop computers, message processors, handheld devices, multi-processor systems, microprocessor-based or programmable consumer electronics, network PCs, minicomputers, mainframe computers, mobile telephones, PDAs, tablets, pagers, routers, switches, various storage devices, and the like. The disclosure may also be practiced in distributed system environments where local and remote computer systems, which are linked (either by hardwired data links, wireless data links, or by any combination of hardwired and wireless data links) through a network, both perform tasks. In a distributed system environment, program modules may be located in both the local and remote memory storage devices.

Further, where appropriate, the functions described herein can be performed in one or more of hardware, software, firmware, digital components, or analog components. For example, one or more application specific integrated circuits (ASICs) can be programmed to carry out one or more of the systems and procedures described herein. Certain terms are used throughout the description, and claims refer to particular system components. As one skilled in the art will appreciate, components may be referred to by different names. This document does not intend to distinguish between components that differ in name, but not function.

It should be noted that the sensor embodiments discussed above may comprise computer hardware, software, firmware, or any combination thereof to perform at least a portion of their functions. For example, a sensor may include computer code configured to be executed in one or more processors and may include hardware logic/electrical circuitry controlled by the computer code. These example devices are provided herein for purposes of illustration and are not intended to be limiting. Embodiments of the present disclosure may be implemented in further types of devices, as would be known to persons skilled in the relevant art(s).

At least some embodiments of the present disclosure have been directed to computer program products comprising such logic (e.g., in the form of software) stored on any computer-usable medium. Such software, when executed in one or more data processing devices, causes a device to operate as described herein.

While various embodiments of the present disclosure have been described above, it should be understood that they have been presented by way of example only, and not limitation. It will be apparent to persons skilled in the relevant art that various changes in form and detail can be made therein without departing from the spirit and scope of the present disclosure. Thus, the breadth and scope of the present disclosure should not be limited by any of the above-described exemplary embodiments but should be defined only in accordance with the following claims and their equivalents. The foregoing description has been presented for the purposes of illustration and description. It is not intended to be exhaustive or to limit the present disclosure to the precise form disclosed. Many modifications and variations are possible in light of the above teaching. Further, it should be noted that any or all of the aforementioned alternate implementations may be used in any combination desired to form additional hybrid implementations of the present disclosure. For example, any of the functionality described with respect to a particular device or component may be performed by another device or component. Further, while specific device characteristics have been described, embodiments of the disclosure may relate to numerous other device characteristics. Further, although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments.

That which is claimed is:

1. A method comprising:
   transporting a delivery robot in an autonomous vehicle, the autonomous vehicle including a computer system and a navigation assistance system;
   disembarking the delivery robot from the autonomous vehicle;
   generating, by the computer system, for the delivery robot, in cooperation with the navigation assistance system of the autonomous vehicle, a route map of a terrain between the autonomous vehicle and a package drop-off spot;
   determining a relative position of the delivery robot with respect to the autonomous vehicle;
   determining a current location of the delivery robot in the route map based on the relative position; and
   transmitting from the autonomous vehicle to the delivery robot, at least one of the route map or a set of navigation instructions that are based on the route map, to assist the delivery robot travel to the package drop-off spot.

2. The method of claim 1, wherein disembarking the delivery robot from the autonomous vehicle comprises disembarking the delivery robot on to a road or a sidewalk, and wherein the package drop-off spot is one of an entryway to a building or a package placement location.

3. The method of claim 2, wherein the building is one of a residence or a business facility.

4. The method of claim 1, wherein the route map includes an identification of one or more obstacles to be circumvented by the delivery robot to reach the package drop-off spot.

5. The method of claim 1, wherein the navigation assistance system of the autonomous vehicle is configured to generate the route map by using at least one of a sensor or an imaging device of the navigation assistance system.

6. The method of claim 1, wherein the route map comprises a digital representation of the terrain, the digital representation comprising one or more areas to be circumvented by the delivery robot to reach the package drop-off spot.

7. The method of claim 1, wherein the route map comprises a digital representation of the terrain, the digital representation comprising a path to be traveled by the delivery robot from the current location of the delivery robot to the package drop-off spot.

8. A method comprising:
   determining, by a navigation assistance system of an autonomous vehicle, a relative position of a delivery robot with respect to the autonomous vehicle;
   determining, by the navigation assistance system, a current location of the delivery robot based on the relative position;
   generating, by a computer system of the autonomous vehicle, in cooperation with the navigation assistance system of the autonomous vehicle, a route map of a terrain between the current location of the delivery robot and a package drop-off spot for the delivery robot; and
   transmitting from the autonomous vehicle to the delivery robot, at least one of the route map or a set of navigation instructions that are based on the route map, to assist the delivery robot travel from the current location to the package drop-off spot.

9. The method of claim 8, further comprising:
   transporting the delivery robot in the autonomous vehicle; and
   disembarking the delivery robot from the autonomous vehicle at the current location.

10. The method of claim 8, wherein the computer system of the autonomous vehicle is configured to generate the route map by using at least one of a sensor or an imaging device of the navigation assistance system.

11. The method of claim 8, wherein the route map comprises a digital representation of the terrain, the digital representation comprising one or more areas to be circumvented by the delivery robot when traveling from the current location to the package drop-off spot.

12. The method of claim 11, wherein the one or more areas to be circumvented by the delivery robot include obstacles.

13. The method of claim 8, wherein the route map is one of a 2D rendering or a 3D rendering of the terrain between the current location of the delivery robot and the package drop-off spot for the delivery robot.

14. A system comprising:
   a delivery robot; and
   an autonomous vehicle comprising:
      a navigation assistance system; and
      a computer system comprising:
         at least one memory that stores computer-executable instructions; and at least one processor configured to access the at least one memory and execute the computer-executable instructions to at least:

cooperate with the navigation assistance system to generate a route map of a terrain between the autonomous vehicle and a package drop-off spot at a delivery destination;

determine a relative position of the delivery robot with respect to the autonomous vehicle;

determine a current location of the delivery robot in the route map based on the relative position; and transmit to the delivery robot, at least one of the route map or a set of navigation instructions that are based on the route map, to assist the delivery robot travel from the current location to the package drop-off spot.

15. The system of claim 14, wherein the autonomous vehicle is configured to transport the delivery robot to the delivery destination, and wherein the package drop-off spot at the delivery destination is one of an entryway to a building or a package placement location.

16. The system of claim 14, wherein the route map comprises a digital representation of the terrain, the digital representation comprising one or more areas to be circumvented by the delivery robot when traveling from the current location of the delivery robot at the delivery destination to the package drop-off spot.

17. The system of claim 16, wherein the one or more areas to be circumvented by the delivery robot include obstacles.

18. The system of claim 14, wherein the route map is one of a 2D rendering or a 3D rendering of the terrain between a current location of the delivery robot at the delivery destination and the package drop-off spot.

19. The system of claim 14, wherein the navigation assistance system comprises at least one of a sensor or an imaging device.

20. The system of claim 19, wherein the sensor is a Light Detection and Ranging (LIDAR) device.

* * * * *